June 4, 1968 W. G. DOSSE 3,387,263
SIGNAL COMPARATOR
Filed Aug. 23, 1965
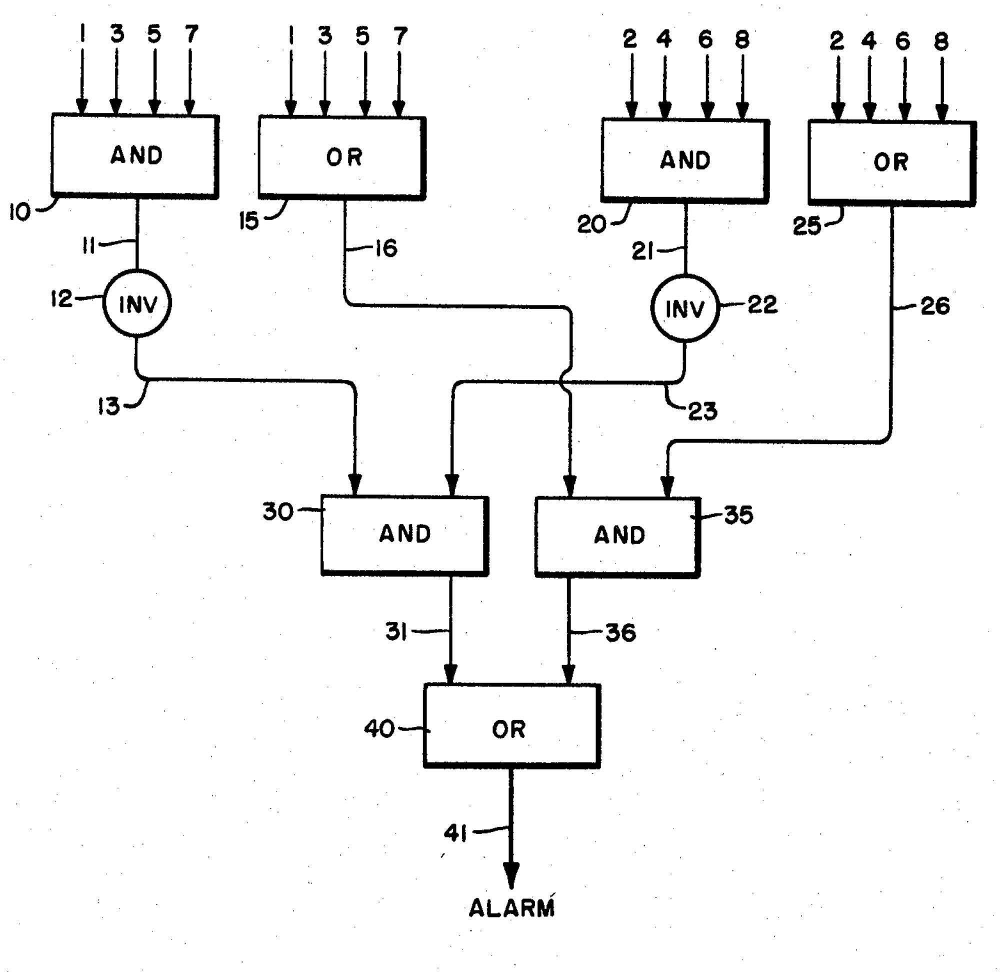
INVENTOR
WILLIAM G. DOSSE
BY R. C. Terry
ATTORNEY United States Patent Office 3,387,263
Patented June 4, 1968

3,387,263
SIGNAL COMPARATOR
William G. Dossé, Lincolnwood, Ill., assignor to Teletype Corporation, Skokie, Ill., a corporation of Delaware
Filed Aug. 23, 1965, Ser. No. 481,521
6 Claims. (Cl. 340—146.2)

ABSTRACT OF THE DISCLOSURE

A circuit for comparing two groups of character bits which together comprise a complete character and for determining whether all the bits in each group are the same and whether the bits comprising one group are opposite from the bits comprising the other group including a pair of AND-gates each having as its input all the bits of one of the groups and a pair of inverters each having as its input the output of one of the AND-gates so that the inverters each produce an output if any of the bits received by their respective AND-gates is spacing, a pair of OR-gates each having as its input all the bits of one of the groups for producing an output if any of the bits it receives is marking and means for gating together the outputs of the inverters and the OR-gates to produce an error signal whenever both groups simultaneously contain a marking bit or whenever both groups simultaneously contain a spacing bit.

This invention relates to signal comparators and more particularly to signal comparators for checking the signals commonly used in testing printing telegraph apparatus.

In the telegraph industry it has long been the practice to test the various machines and devices employed in that industry by sending R-Y signals, that is, by sending pairs of signals in which the one signal has all its odd numbered bits spacing and all its even numbered bits marking and in which the other signal has all its odd numbered bits marking and all its even numbered bits spacing. In order that these testing operations may be as automatic as possible it is desirable to provide an automatic device for assuring that the proper signals are being sent to or received from the device being tested, as the case may be.

Accordingly, it is an object of this invention to check signals used for the testing of telegraph machines other than by observing characters recorded under the control of the signals.

Another object of this invention is to provide a signal comparator which assures that specific ones of the bits in the signal being tested are of one condition and that the remainder of the bits in the signal being tested are of the opposite condition.

A still further object of this invention is to provide a telegraph signal tester which alarms if anything other than an R or a Y signal is received.

In the preferred embodiment of the invention all of the bits which are supposed to be of a first condition in the signal to be checked are simultaneously applied to an AND-gate which emits a signal only if all of the bits comprising its input are of the first condition. The output of this AND-gate is fed into an inverter so that the inverter gives an output if any of the input bits to the AND-gate are of a second condition. Similarly, all of the bits which are supposed to be of a second condition are applied to an AND-gate-inverter combination which gives an output if any of its input bits are of the first condition. The bits which are supposed to be of the first condition are also applied to an OR-gate which emits an output if any of its input bits are of the first condition while the bits which are supposed to be of the second condition are applied to an identical OR-gate.

The outputs of the two AND-gate-inverter combinations are applied to a final AND-gate as are the outputs of the two OR-gates. These final AND-gates emit a signal only if an input is received from both inputs. Accordingly, one of these final AND-gates emits an output only if both sets of bits being tested contain at least one bit of the first condition while the other of these final AND-gates emits an output only if both sets of bits being tested contain at least one bit of the second condition. Since either of these situations indicates that an invalid signal has been received, the outputs of the final AND-gates are used to initiate an invalid signal alarm.

A more complete understanding of the invention may be had by referring to the following detailed description when taken in conjunction with the drawing wherein FIG. 1 is a schematic illustration of a circuit embodying the invention.

Referring now to the drawing there is shown a mechanism for comparing the bits which make up a telegraph signal. These bits are binary in nature in that they are either of one condition or the other, and in that no possible conditions other than these two exist. In the telegraph industry the two conditions of the binary bits which make up the telegraph signal are often referred to as marking and spacing; however, in related arts these conditions are sometimes referred to as positive and negative, on and off, one and zero, etc. each of these terms indicating a first possible condition and a second possible condition different from the first.

The circuit shown in the drawing is designed to check telegraph signals and to note the occurrence of any signal other than an R or a Y signal. For the purpose of this description R signals are signals in which all of the even numbered bits of the signal being tested are in a marking condition and all of the odd numbered bits are in a spacing condition. A Y signal is a signal in which all of the odd numbered bits are in a marking condition and in which all of the even numbered bits are in a spacing condition.

In the drawing there is shown an AND-gate 10 to which there extend a plurality of conductors indicated by the numerals 1, 3, 5 and 7. The conductors 1, 3, 5 and 7 comprise the input to the AND-gate 10 and they extend from a signal generating device such as a tape reader. On the conductor designated 1 the first bit of the signal will be received, on the conductor designated 3, the third bit of the signal being tested will be received, etc. Thus, the input to the AND-gate 10 is comprised of all of the odd numbered bits of the signal being tested. The AND-gate 10 is conventional in that it emits a signal on its output conductor 11 if all of its inputs are marking and in that it does not emit a signal on its output conductor 11 if any of its inputs are spacing.

The output conductor 11 extends to and becomes the input of an inverter 12. This inverter emits a signal on its output conductor 13 if no signal is received over the conductor 11 from the AND-gate 10. The inverter 12 does not emit a signal on its output conductor 13 if a signal is received from the AND-gate 10. Thus, a signal will be present on the conductor 13 if any of the bits applied to the input of the AND-gate 10 are in a spacing condition. Further, there will be no signal on the wire 13 if all of the bits 1, 3, 5 and 7 applied to the input of the AND-gate 10 are in a marking condition.

The bits 1, 3, 5 and 7 which are applied to the input of AND-gate 10 are also impressed on the input to an OR-gate 15. This OR-gate is conventional in that it emits a signal on its output conductor 16 if any of the bits which comprise its input are in a marking condition. It does not emit a signal on its output conductor 16 if all of the bits 1, 3, 5, and 7 which comprise its input are in a spacing condition.

The even numbered bits, that is, the bits 2, 4, 6 and 8, comprise the input of an AND-gate 20 which is identical to the AND-gate 10. Like the AND-gate 10 the AND-gate 20 emits a signal on its output conductor 21 if all of the bits which comprise its input are in a marking condition.

It does not emit a signal on its output conductor 21 if any of the bits which comprise its inputs are in a spacing condition. The conductor 21 also comprises an input to an inverter 22 which, like the inverter 12, emits a signal on its output conductor 23 if no signal is received from the AND-gate 20 and does not emit on its output 23 if a signal is received from the AND-gate 20.

The even numbered bits which comprise the input to the AND-gate 20 also comprise the input to OR-gate 25 which is identical to the OR-gate 15. The OR-gate 25 emits a signal on its output conductor 26 whenever any of the even numbered bits which comprise inputs are in a marking condition and does not emit a signal on its output conductor 26 when all of the even numbered bits are in a spacing condition.

The conductors 13 and 23 which extend from the inverters 12 and 22 comprise the input of an AND-gate 30. This AND-gate 30 emits a signal on its output conductor 31 whenever there is a signal present on both of the conductors 13 and 23. Thus, since the inverters 12 and 22 emit signals whenever any of the input bits to their respective AND-gates is in a spacing condition, the AND-gate 30 emits a signal on the conductor 31 only when there is at least one input to both the AND-gate 10 and the AND-gate 20 which is in a spacing condition.

The output conductors 16 and 26 which extend from the OR-gates 15 and 25 form the input for an AND-gate 35. The AND-gate 35 emits a signal on its output conductors 36 whenever a signal is present on both the conductors 16 and 26, that is, a signal is present on the conductor 36 whenever at least one of the inputs to both the OR-gate 15 and the OR-gate 25 is in a marking condition.

The conductors 31 and 36 comprise the input to an OR-gate 40 which by way of its output conductor 41 serves to trigger an alarm such as a light, a bell, etc., whenever an input is received on either of the conductors 31 and 36. If it is desirable, the output of the OR-gate 40 may be used to interrupt operation of the device which is supplying the inputs to the gates 10, 15, 20 and 25.

As has been noted previously the device shown in the drawing is designed to check R and Y signals. In these signals the odd numbered bits are always either all marking in the case of the Y signal or are all spacing in the case of the R signal. Similarly, the even numbered bits are either all marking in the case of an R signal or are all spacing in the case of the Y signal. Accordingly, if a marking condition is present at the input of both the OR-gate 15 and the OR-gate 25 the signal received cannot be either an R signal or a Y signal. The presence of a marking bit at both the OR-gate 15 and the OR-gate 25 is used, therefore, to cause the AND-gate 35 to trigger an alarm thereby noting that an incorrect signal has been received. Similarly, if a spacing condition is present at the inputs of both the AND-gate 10 and the AND-gate 20 there will be a signal on the wires 13 and 23. Since the signal received cannot be either a Y signal or an R signal if there is a spacing condition present at both the AND-gate 10 and the AND-gate 20 the presence of a signal on the wires 13 and 23 is used to cause the AND-gate 30 to trigger an alarm noting an error. Thus, the device will not alarm if either an R or a Y signal is received, but will alarm if any combination of signal bits is received which is not representative of one of these two conditions.

Assuming now that an R signal is received on the circuit and that the signal is correct, all the bits comprising the input to the AND-gate 10 will be spacing.

Accordingly, there will be no output on the wire 11. The inverter 12, having received no signal, will emit a signal on its output 13. All of the bits which comprise the input to the AND-gate 20 will be marking. Accordingly, the AND-gate 20 will emit a signal on the conductor 21. The inverter 22 having received this signal from the AND-gate 20 will not emit a signal on the output 23. Since a signal will be present on the conductor 13 and since no signal will be present on the conductor 23, the AND-gate 30 will not emit a signal on the conductor 31 and will not cause the OR-gate 40 to emit a signal on hte conductor 41.

Similarly, the bits which comprise the inputs to the OR-gate 15 will all be in a spacing condition, therefore, the OR-gate 15 will not emit a signal on the conductor 16. However, all of the input bits to the OR-gate 25 will be in a marking condition and accordingly, the OR-gate 25 will emit a signal on the conductor 26. Since there will not be a signal on the conductor 16 and since there will be a signal on the conductor 26, the AND-gate 35 will not emit a signal on the conductor 36. Therefore, the OR-gate 40 will not emit a signal on the conductor 41 and the alarm will not be sounded.

It may thus be understood that when an R signal is received by the circuit shown the in drawing there will be no output on the conductor 41 and accordingly, no alarm will be sounded. Similarly, when a Y signal is received by the circuit no output will be recorded since the circuit will operate in exactly the reverse manner to that which has just been described, that is, there will be an output on the conductor 23 but not on the conductor 13 and accordingly, there will be no output on the conductor 31. Similarly, there will be an output on the conductor 16 but not on the conductor 26 and accordingly, there will be no output on the conductor 36. Since there is no output on either the conductor 31 or the conductor 36 there will be no output on the conductor 41 hence the circuit will not alarm.

Assume now that a signal is received on a circuit which purports to be a Y signal but which in fact has one of its even numbered bits marking, for example, assume it has its fourth bit marking. In that case bits 1, 3, 5 and 7 will be marking and accordingly, there will be no output on the conductor 13. Bits 2, 6 and 8 will be spacing but 4 will be marking. This, however, will not cause the AND-gate 20 to emit a signal on its output conductor 21 and, therefore, there will be a signal on the conductor 23. However, since there will be no signal on the conductor 13 the AND-gate 30 will not emit a signal on the conductor 31 and accordingly will not cause the OR-gate 40 to emit a signal on the conductor 41. Since the bits 1, 3, 5 and 7 will be marking the OR-gate 15 will emit a signal on the conductor 16. Since bit 4 will be marking the OR-gate 25 will emit a signal on the conductor 26. The presence of the signal on both the conductor 16 and 26 will cause the AND-gate to emit a signal on the conductor 36. This in turn will cause the OR-gate 40 to emit a signal on the conductor 31 which in turn will cause the system to alarm. From this it should be apparent that whenever there is a marking condition in one of the even numbered bits of a Y signal, an alarm will sound regardless of which of the bits is marking. It should also be apparent that whenever one of the odd numbered bits is marking in an R signal a similar result will be obtained and the alarm will be operated. Assume now that the circuit receives a signal which purports to be a Y signal but which has one of its odd numbered bits spacing. In this case there will be no output on the conductor 11 from the AND-gate 10, therefore, the inverter 12 will emit a signal on the conductor 13. Since all of the even numbered bits will be spacing there will be no signal emitted on the conductor 21 from the AND-gate 20. Accordingly, the inverter 22 will emit a signal on the conductor 23. The presence of signals on both the conductor 13 and the conductor 23 will cause the AND-gate 30 to emit a signal on the conductor 31 which in turn will cause the OR-gate 40 to emit a signal on the conductor 41 thereby causing the circuit to alarm. It should be apparent that this alarm will result regardless of which of the odd numbered bits is in a spacing condition and it should further be apparent that a similar result will be obtained when a signal which purports to be an R signal, but which in fact has one of its even numbered bits in the spacing condition is received by the circuit.

Assume now that a signal is received which purports to be a Y signal, but which in fact has one of its odd numbered bits spacing and also has one of its even numbered bits marking. In this case there will be marking and spacing elements present in the signals received by both the AND-gates 10 and 20 and both the OR-gates 15 and 25. This will cause outputs to be present on all of the conductors 13, 16, 23 and 26. This will cause both the AND-gates 30 and 35 to emit signals on their respective outputs which in turn will cause the OR-gate 40 to emit a signal on the output 41. The presence of two input signals in the OR-gate 40 will not disturb its operation, since it emits no signal on conductor 41 only when there is no signal on either of the conductors 31 and 36.

It should be evident from the above description that the circuit shown in the drawing will alarm under any combination of input signals in which there are spacing and marking condition both present at the inputs of any of the gates 10, 15, 20 and 25. It should further be evident that it is not necessary to apply only the odd numbered bits to the gates 10 and 15 or only the even numbered bits to the gates 20 and 25. Any combination of bits may be applied at either set of gates depending on a particular combination of bits it is desired to recognize. The circuit will, however, always recognize the desired combination and its exact opposite, that is, the signal in which all the bits which were previously marking are spacing and in which all the bits which were previously spacing are now marking.

Although only one embodiment of the invention is shown in the drawings and described in the foregoing specification, it will be understood that the invention is not limited to the specific embodiment described, but is capable of modification and rearrangement and substitution of parts and elements without departing from the spirit of the invention.

What is claimed is:

1. A circuit for analyzing binary signal code combinations composed of bits arbitrarily designated as groups comprising as one group all of the marking bits and the other group all of the spacing bits including:

means for recognizing the presence of at least one marking bit in each of the groups of bits;

means for recognizing the presence of at least one spacing bit in each of the groups of bits, and means actuated by both of the recognizing means for reporting the occurrence of at least one marking bit in each of the groups or the occurrence of at least one spacing bit in each of the groups, thereby to evidence an error in the signal code combination.

2. A device for analyzing each of two complementary permutation code combinations of signal bits each of which is either in a first condition or a second condition comprising, dual means for receiving the same predetermined ones of the signal bits of the code combinations and for recognizing in one of the means absence of bits having one condition and in the other means absence of bits having the other condition, other dual means for receiving the remainder of the bits of the code combinations and for recognizing in one of them absence of bits having one condition and in the other one absence of bits having the oeher condition, and means controlled conjointly by all of the hereinbefore recited recognizing means for indicating reception by any of them of a combination of bits of both conditions.

3. A device for analyzing a signal consisting of a combination of a predetermined number of binary signal bits each of which is either in a first condition or a second condition including:

first comparing means having an input and an output for receiving predetermined ones of the bits and for emitting a signal if any of them are in the second condition;

second comparing means having an input and an output for receiving the remainder of the bits and for emitting a signal if any of them are in the second condition, and means having an input and an output for receiving the outputs of the two comparing means and for indicating a deviation from a predetermined pattern of bits in the signal being analyzed if an output is received from both of the two comparing means.

4. A device for analyzing a signal consisting of a predetermined number of consecutively numbered binary signal bits each of which is either in a first condition or a second condition and for indicating an error when a deviation from a predetermined pattern of bits occurs including:

first comparing means having an input and an output for receiving all of the odd numbered bits and for emitting a signal if any of the odd numbered bits are in the second condition;

second comparing means having an input and an output for receiving all of the even numbered bits and for emitting a signal if any of the even numbered bits are in the second condition, and means having an input and an output for receiving the outputs of the two comparing means and for indicating an error in the signal being compared if an output is received from either of the two comparing means.

5. A comparison circuit for comparing a plurality of input binary signal bits each of which is in either a first or a second condition including:

first means having an input and an output for receiving a portion of the plurality of bits to be compared and for emitting a signal if any of the bits in the portion of bits received are in the second condition;

a first OR-gate having an input and an output for receiving the same portion of the plurality of bits to be compared as are received by the first means and for emitting a signal if any of the bits in the portion of bits received are in the first condition;

second means having an input and an output for receiving the remainder of the bits to be compared and for emitting a signal if any of the bits in the remainder of the bits to be compared are in the second condition;

a second OR-gate having an input and an output for receiving the same remainder of the bits to be compared as is received by the second means and for emitting a signal if any of the bits in the remainder of the bits received are in the first condition;

a first AND-gate having an input and an output for rereceiving the outputs of the first means and the second means and for emitting a signal if a signal is received from both the first means and the second means;

a second AND-gate having an input and an output for receiving the outputs of the first OR-gate and the second OR-gate and for emitting a signal if a signal is received from both the first OR-gate and the second OR-gate, and third means for receiving the outputs of both the first and the second AND-gates and for indicating deviation from a predetermined pattern in the signal bits being compared if a signal is received from either the first AND-gate or the second AND-gate.

6. A comparison circuit for comparing a plurality of input binary signal bits each of which is in either a first or a second condition including:

a first AND-gate having an input and an output for receiving a portion of the plurality of bits to be compared and for emitting a signal if all of the bits in the portion of bits received are in the first condition;

a first inverter having an input and an output for receiving the output of the first AND-gate and for emitting a signal whenever no signal is emitted by the first AND-gate;

a first OR-gate having an input and an output for receiving the same portion of the plurality of bits to be compared as are received by the first AND-gate and for emitting a signal if any of the bits in the portion of bits received are in the first condition;

a second AND-gate having an input and an output for receiving the remainder of the bits to be compared and for emitting a signal if all of the bits in the remainder of the bits to be compared are in the first condition;

a second inverter having an input and an output for receiving the output of the second AND-gate and for emitting a signal whenever no signal is emitted by the second AND-gate;

a second OR-gate having an input and an output for receiving the same remainder of the bits to be compared as is received by the second AND-gate and for emitting a signal if any of the bits in the remainder of the bits received are in the first condition;

a third AND-gate having an input and an output for receiving the outputs of the first inverter and the second inverter and for emitting a signal if a signal is received from both the first inverter and the second inverter;

a fourth AND-gate having an input and an output for receiving the outputs of the first OR-gate and the second OR-gate and for emitting a signal if a signal is received from both the first OR-gate and the second OR-gate;

a third OR-gate having an input and an output for receiving the outputs of the third and the fourth AND-gates and for emitting a signal if a signal is received from either the third or the fourth AND-gate; and an alarm for activation by a signal in the output of the third OR-gate.

References Cited

UNITED STATES PATENTS

| | | | |
|---|---|---|---|
| 3,193,812 | 7/1965 | Friend | 340—174.1 |
| 3,248,692 | 4/1966 | Shih | 340—146.1 |

OTHER REFERENCES

"A method to Determine at the source the Validity of Transmitted Signals," by P. L. Randlev, pp. 44–45, IBM Technical Disclosure Bulletin, vol. 2, No. 5, February 1960.

Chu, Y., Digital Computer Design Fundamentals, pp. 112–113, McGraw-Hill Book Co., Inc. 1962.

MALCOLM A. MORRISON, *Primary Examiner.*

V. SIBER, *Assistant Examiner.*